United States Patent [19]
Weber

[11] Patent Number: 4,782,655
[45] Date of Patent: Nov. 8, 1988

[54] AIR LIQUIFICATION SYSTEM FOR COMBUSTORS OR THE LIKE

[75] Inventor: Kent Weber, Rockford, Ill.

[73] Assignee: Sundstrand Corporation, Rockford, Ill.

[21] Appl. No.: 938,392

[22] Filed: Dec. 5, 1986

[51] Int. Cl.[4] .............................. F02C 3/22; F02K 9/42
[52] U.S. Cl. ................................ 60/39.02; 60/39.465; 60/728; 60/260
[58] Field of Search ............... 60/39.02, 39.465, 257, 60/260, 259, 258, 728, 39.461, 736, 204

[56] References Cited

U.S. PATENT DOCUMENTS

| | | | |
|---|---|---|---|
| 2,219,994 | 10/1940 | Jung . | |
| 2,563,270 | 8/1951 | Price . | |
| 2,672,726 | 3/1954 | Wolf et al. . | |
| 2,960,834 | 11/1960 | Kirkpatrick | 60/257 |
| 3,002,340 | 10/1961 | Landerman . | |
| 3,040,520 | 6/1962 | Rae | 60/260 |
| 3,756,024 | 9/1973 | Gay . | |
| 3,775,977 | 12/1973 | Builder et al. . | |
| 4,288,979 | 9/1981 | Liljedahl et al. | 60/39.12 |

FOREIGN PATENT DOCUMENTS 736486 5/1943 Fed. Rep. of Germany .
857870 10/1940 France .
749009 5/1956 United Kingdom .

*Primary Examiner*—Edward E. Stout
*Attorney, Agent, or Firm*—Wood, Dalton, Phillips, Mason & Rowe

[57] ABSTRACT

An air liquification system for a combustor or the like, including a condenser having an air intake and a heat exchanger for cooling the air to substantially a liquid state. A first conduit conducts the liquid air to the combustor. A source of hydrogen in a liquid state is provided, and a second conduit conducts the liquid hydrogen to the heat exchanger whereby the hydrogen acts as the cooling medium therein. A third conduit conducts the hydrogen from the heat exchanger to the combustor and includes a compressor for compressing the hydrogen up to a given combustor pressure. A second combustor may be provided for operating at ambient air pressure, with a portion of the hydrogen from the condenser being conducted to the second combustor upstream of the compressor. An air precooler may be provided upstream of the heat exchanger for passing the liquid air therethrough to act as a regenerative cooling medium therein prior to conducting the air to the first combustor.

13 Claims, 1 Drawing Sheet

AIR LIQUIFICATION SYSTEM FOR COMBUSTORS OR THE LIKE

FIELD OF THE INVENTION

This invention generally relates to power plant gas generator systems and, particularly, to an air liquification system for combustors.

BACKGROUND OF THE INVENTION

Air liquification systems are known wherein a high energy fuel, such as hydrogen, is stored in a liquid state and burned in a gaseous state. The liquid hydrogen is used in a condenser for converting ambient air to a liquid state. During the condensing process, the liquid hydrogen is converted into a gaseous state for use with the combustor. The liquid air, in turn, is fed to the combustor for mixing with the gaseous hydrogen.

In some schemes, two combustors are utilized wherein one combustor operates at greater than ambient pressure and a second combustor operates at ambient pressure. In such schemes, a portion of the liquid hydrogen is conducted directly to the high pressure combustor for mixing with the liquid air. Ambient air is fed directly to the low pressure combustor for mixing with the remainder of the hydrogen which has been converted to a gaseous state in the process of liquifying the air.

A major problem with systems as described above, such as in an aircraft propulsion engine, is that the ratio of the mass flow of air to the mass flow of liquid hydrogen used to generate the high pressure air has been insufficient, with the result that overall propulsion efficiencies are low. It would be desirable to provide an improved system wherein the amount of air liquified per unit of hydrogen is significantly increased. This invention is directed to solving the above problems and satisfying such needs.

SUMMARY OF THE INVENTION

An object, therefore, of the invention is to provide a new and improved air liquification system for a combustor or the like.

Generally, the invention contemplates a system wherein liquid hydrogen is gassified during the condensing process for converting ambient air to a liquid state and then recompressing the warmed hydrogen to a suitable combustor pressure.

In the exemplary embodiment of the invention, the air liquification system includes condenser means having air intake means and heat exchanger means for cooling the air to substantially a liquid state. First conduit means conducts the liquid air to the combustor. A source of hydrogen is provided in a liquid state, and second conduit means conducts the liquid hydrogen to the heat exchanger means whereby the hydrogen acts as a cooling medium to liquify the air. Third conduit means are provided for conducting the hydrogen from the condenser means to the combustor and incorporates compressor means for compressing the hydrogen up to a given combustor pressure.

The system includes expander means for the hydrogen interposed between first and second, serially connected portions of the heat exchanger means. In addition, a precooler may be employed to precool the ambient air by using the liquid air itself as a regenerative cooling medium.

The system may be incorporated with a propulsion system including a second combustor for operating at ambient air pressure. In such applications, a portion of the hydrogen is conducted to the second combustor from the condenser means prior to compressing the hydrogen which is conducted to the first combustor.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
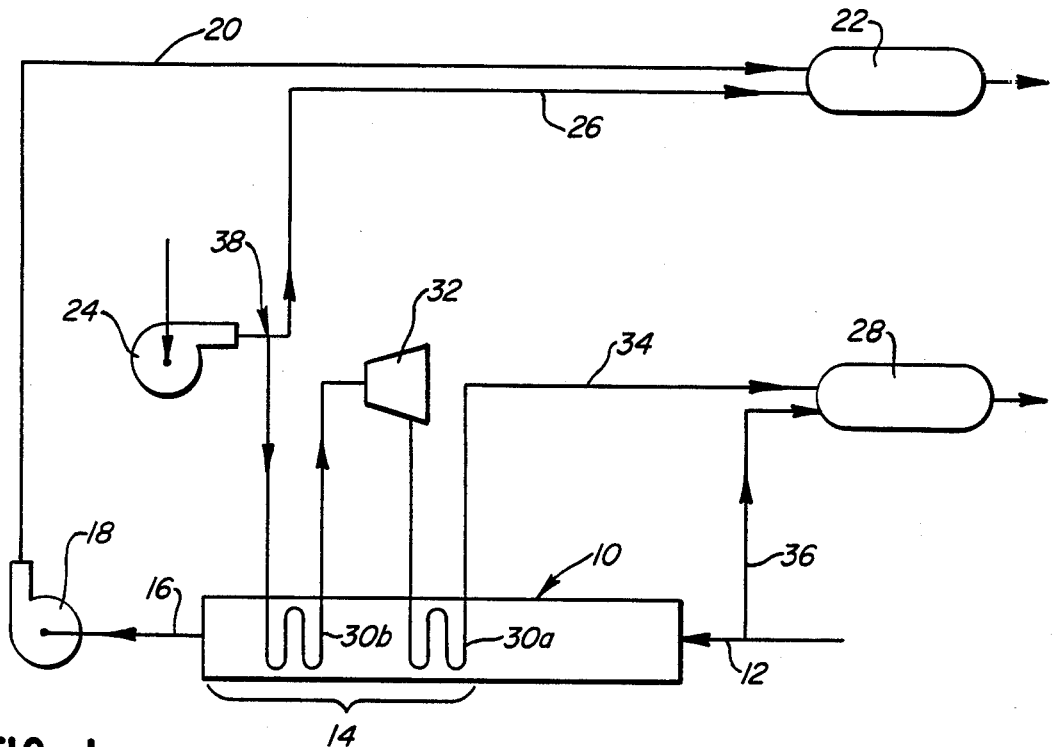
FIG. 1 is a schematic illustration of a liquid air generation system according to the prior art.

Referring to the drawings in greater detail, FIG. 1 shows an air liquification system of the prior art wherein a condenser, generally designated 10, includes ambient air intake means as indicated at 12. The condenser includes an air liquification zone 14. Liquified air exits condenser 10, as at 16, toward a liquid air pump 18. The pump conducts the liquid air through an appropriate conduit means 20 to a first combustor 22. Liquid hydrogen is conducted from an appropriate source, by a liquid hydrogen pump 24, through appropriate conduit means 26 to combustor 22 for mixture with the liquid air for combustion purposes.

At this point, it should be noted that the scheme of FIG. 1 includes two combustors, including combustor 22 and a second combustor 28. It will be seen from the above, along with the following further description, that combustor 22 operates at a greater than ambient pressure, and second combustor 28 operates at ambient pressure. Therefore, it can be seen that liquid air pump 18 and liquid hydrogen pump 24 are utilized to feed a pressurized mixture to combustor 22. Normally, only approximately 20% of the liquid hydrogen supply is conducted through conduit means 26 to combustor 22.

The remainder of the liquid hydrogen (e.g. 80%), is conducted to condenser 10 which includes heat exchanger portions 30a and 30b. The liquid hydrogen, thereby, is used as the cooling medium in liquification zone 14 for liquifying the ambient air entering the condenser at 12. Heat exchanger portions 30a 30b are serially connected, and a hydrogen expander 32 is incorporated in the conducting means for the hydrogen. The expander lowers the pressure and temperature of the hydrogen gas leaving heat exchanger portion 30b to permit additional production of liquid air in heat exchanger portion 30a. During the condensing process, the hydrogen warms and converts into a gaseous state and is conducted by appropriate conduit means 34 to second combustor 28, usually at a low or near ambient pressure. Ambient air is fed to combustor 28, by appropriate conduit means 36, without any liquification for mixing with the gaseous hydrogen for combustion in combustor 28.

From the foregoing, it can be seen that in conventional prior art air liquification systems as described in relation to FIG. 1, the liquid hydrogen is "split", as at 38, whereby a portion (e.g. 20%) of the liquid hydrogen is conducted to high pressure combustor 22, and the remainder of the liquid hydrogen (e.g. 80%) is conducted to condenser 10 for use in heat exchanger portions 30a,30b to liquify the incoming ambient air. As will be seen below, the invention contemplates the utilization of all of the liquid hydrogen to do the heat exchanger work. Since the amount of liquified air is proportional to the heat exchange, a more efficient air liquification system is afforded.

Figure 2:
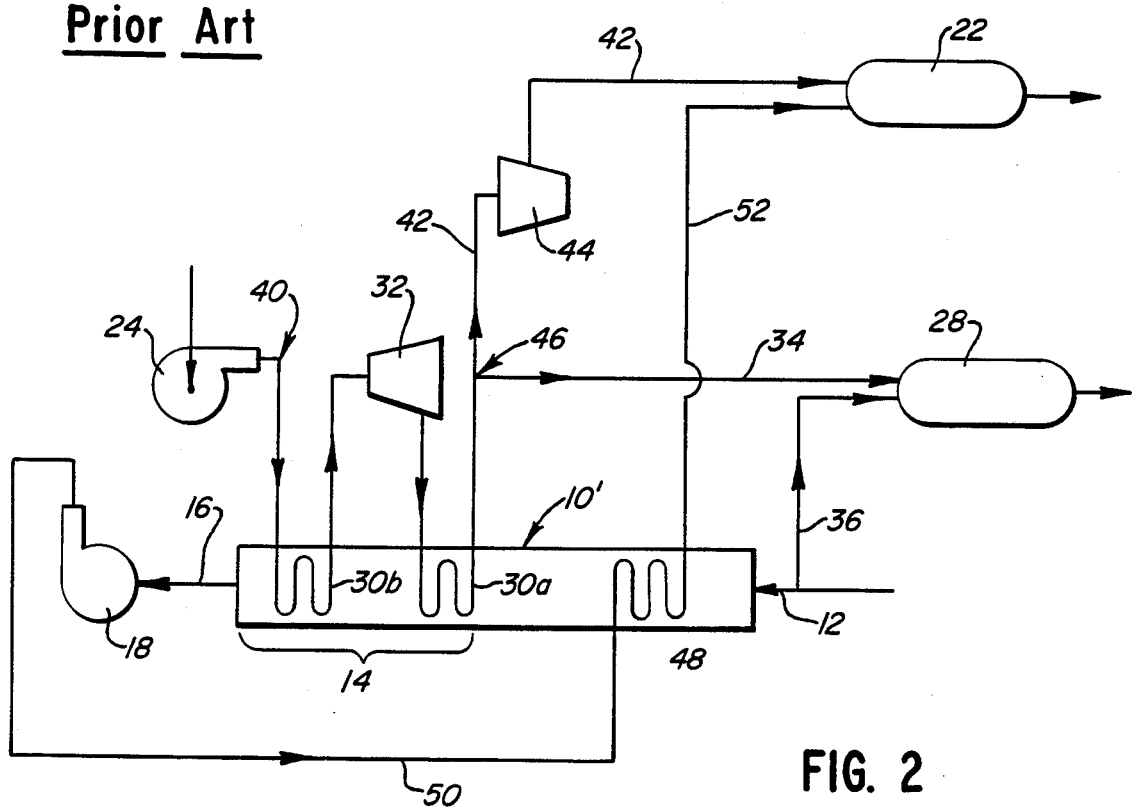
FIG. 2 is a schematic illustration of the air liquification system of the invention.

More particularly, referring to FIG. 2, the invention contemplates an air liquification system which includes a condenser 10' similar to condenser 10 in FIG. 1. For purposes of illustration, like numerals have been applied to like components in FIG. 2 corresponding to like components in FIG. 1.

First of all, it can be seen that all of the liquid hydrogen is conducted by pump 24, as at 40, to heat exchanger portions 30a, 30b and expander means 32. After the entire liquid hydrogen has been used for air liquification purposes in air liquification zone 14, the hydrogen, which now is in substantially a gaseous state, is conducted by appropriate conduit means 42 through a compressor 44 which brings the hydrogen up to a suitable combustor pressure. The hydrogen is "split", as at 46, whereby a portion (e.g. 20%) of the hydrogen is conducted to compressor 44 and the remainder (e.g. 80%) of the hydrogen still is conducted to second combustor 28. As with the prior scheme, gaseous ambient air is conducted, as at 36, to combustor 28 for mixing with the gaseous hydrogen for combustion purposes.

The invention also contemplates precooling means for the ambient air entering condenser 10' by using the liquid air as a regenerative cooling medium. More particularly, a precooler heat exchanger 48 is employed for receiving liquified air from liquid air pump 18 through conduit means 50 leading to the precooler heat exchanger. The precooler means, therefore, is disposed between ambient air intake 12 and air liquification heat exchangers 30a,30b. During the precooling process, the liquified air is warmed and undergoes a phase change whereby gaseous air is conducted through appropriate conduit means 52 to combustor 22 for mixing with the gaseous hydrogen for combustion purposes.

Therefore, while the prior art scheme of FIG. 1 feeds liquid hydrogen and liquid air to high pressure combustor 22 and gaseous hydrogen and gaseous air to low pressure combustor 28, the scheme of the invention as illustrated in FIG. 2 feeds gaseous hydrogen and gaseous air to both combustors. This is made possible by the overall scheme of utilizing the entire source of liquid hydrogen in a more efficient manner for liquifying the incoming ambient air, compressing the now gaseous hydrogen back up to a suitable combustor pressure for combustor 22, and regenerating the liquid air for precooling purposes and feeding the converted gaseous air to combustor 22. In comparison, by using the aforementioned 20-80% ratio, a 20% more efficient system is afforded because all of the liquid hydrogen is used for air liquification purposes, whereas the prior art scheme of FIG. 1 conducts a portion of the liquid hydrogen (i.e. 20% through conduit means 26) directly to high pressure combustor 22.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

I claim:

1. An air liquification system for a pair of combustors or the like, comprising:
    condenser means including air intake means and heat exchanger means for cooling the air to substantially a liquid state;
    first means for conducting the liquid air through a precooler means of said condenser means;
    a source of hydrogen in a liquid state;
    second means for conducting the liquid hydrogen to the heat exchanger means whereby the hydrogen acts as a cooling medium therein;
    third means for conducting hydrogen from the heat exchanger means to one of the combustors including compressor means for compressing the hydrogen up to a given combustor pressure; and
    a second combustor for operating at ambient air pressure, and including conduit means for conducting a portion of the hydrogen from the condenser means to the second combustor upstream of the compressor means.

2. The air liquification system of claim 1 wherein said second conducting means include expander means for expanding at least a portion of the hydrogen being used as the cooling medium.

3. The air liquification system of claim 2 wherein said heat exchanger means include a first portion and a second portion serially connected, and said expander means are located between the first and second portions.

4. The air liquification system of claim 1 wherein said heat exchanger means include a first portion and a second portion serially connected, and including hydrogen expander means between the first and second portions.

5. The air liquification system of claim 1, wherein said precooler means is upstream of said heat exchanger means and wherein the first conducting means passes the liquid air through the precooler means to act as a regenerative cooling medium therein prior to conducting the air to the combustor.

6. An air liquification system for a pair of combustors or the like, comprising:
    condenser means including air intake means, heat exchanger means for cooling the air to substantially a liquid state, and precooler means between the air intake means and the heat exchanger means;
    first means for conducting the liquid air through the precooler means to act as a regenerative cooling medium therein and thereafter conducting the air to one of the combustors;
    a source of hydrogen in a liquid state;
    second means for conducting the liquid hydrogen to the heat exchanger means whereby the hydrogen acts as the cooling medium therein;
    third means for conducting a portion of the hydrogen from the heat exchanger means to the one combustor, including compressor means for compressing the hydrogen up to a given combustor pressure; and fourth means for conducting the remainder of the hydrogen from the heat exchanger means to the other of the combustors.

7. The air liquification system of claim 6 wherein said second conducting means include expander means for expanding at least a portion of the hydrogen being used as the cooling medium.

8. The air liquification system of claim 7 wherein said heat exchanger means include a first portion and a second portion serially connected, and said expander means are located between the first and second portions.

9. The air liquification system of claim 6 wherein said condenser means include a precooler portion, and wherein said first conducting means passes the liquid air through the precooler portion to act as a regenerative cooling medium therein prior to conducting the air to the one combustor.

10. The air liquification system of claim 6 wherein said heat exchanger means include a first portion and a second portion serially connected, and including hydrogen expander means between the first and second portions.

11. An air liquification process for a pair of combustors or the like, comprising the steps of:
 condensing air to substantially a liquid state with a liquid hydrogen cooling medium;
 conducting the liquid air through a precooler before conducting the air to one of the combustors; and
 conducting the hydrogen to the pair of combustors after the hydrogen has been used to condense the air in a manner wherein a portion of the hydrogen is conducted directly to one of the combustors operating at ambient air pressure while the remaining portion of the hydrogen is compressed to a given combustor pressure before being conducted to the other of the combustors.

12. The process of claim 11, including expanding at least a portion of the hydrogen being used as the cooling medium.

13. The process of claim 11, including using the liquid air as a regenerative cooling medium to precool the air prior to condensing the air.

* * * * *